United States Patent [19]

Blase

[11] Patent Number: 5,425,451
[45] Date of Patent: Jun. 20, 1995

[54] COMPACT DISC CASE

[76] Inventor: William F. Blase, 1409 Golden Leaf Way, Stockton, Calif. 95209

[21] Appl. No.: 238,695

[22] Filed: May 5, 1994

[51] Int. Cl.$^6$ .............................................. B65D 85/57
[52] U.S. Cl. ..................................... 206/313; 206/309
[58] Field of Search ............................... 206/307–313, 206/387, 444

[56] References Cited

U.S. PATENT DOCUMENTS

| | | | |
|---|---|---|---|
| 3,042,469 | 7/1962 | Lowther | 206/311 |
| 3,265,453 | 8/1966 | Seide | 206/311 |
| 4,613,044 | 9/1986 | Saito et al. | |
| 4,694,957 | 9/1987 | Ackeret | 206/309 |
| 4,736,840 | 4/1988 | Deiglmeier | |
| 4,875,743 | 10/1989 | Gelardi et al. | 206/309 |
| 4,998,618 | 3/1991 | Borgions | 206/307 |
| 5,099,995 | 3/1992 | Karakane et al. | 206/309 |
| 5,168,991 | 12/1992 | Whitehead et al. | |
| 5,176,250 | 1/1993 | Cheng | 206/313 |
| 5,205,405 | 4/1993 | O'Brien et al. | |
| 5,244,084 | 9/1993 | Chan | 206/309 |
| 5,332,086 | 7/1994 | Chuang | 206/444 |

FOREIGN PATENT DOCUMENTS 3440479  5/1986  Germany ............... 206/309

*Primary Examiner*—Jimmy G. Foster

[57] ABSTRACT

A new and improved compact disc case apparatus includes a lower case assembly and an upper case assembly which are placed in registration with each other to form an enclosure assembly. The enclosure assembly includes a side which contains a slot. A pivot assembly is connected between the lower case assembly and the upper case assembly adjacent to a first lower corner and a first upper corner. A disc retention tray is positioned between the lower case assembly and the upper case assembly. The disc retention tray pivots on the pivot assembly such that the disc retention tray can be selectively moved to an open position or a closed position. In the closed position, the disc retention tray is housed completely in the enclosure assembly. In the open position, the disc retention tray is substantially outside the enclosure assembly such that a disc can be selectively taken off of and placed on the disc retention tray. The disc retention tray includes a handle portion. The enclosure assembly includes a truncated corner which is distal to the first lower corner and the first upper corner and which is adjacent to the slotted side. The handle portion of the disc retention tray projects from the truncated corner of the enclosure assembly when the disc retention tray is in a closed position. The disc retention tray includes a recessed edge portion. The recessed edge portion of the disc retention tray is located adjacent to the handle portion of the disc retention tray.

3 Claims, 4 Drawing Sheets

COMPACT DISC CASE

BACKGROUND OF THE INVENTION

1. Field of the Invention

The present invention relates generally to cases for storing sound recording media and, more particularly, to cases especially adapted for storing compact discs.

2. Description of the Prior Art

Current cases for compact discs (CD's) generally require two hands for opening the case and removing the CD. When a person is driving a motor vehicle, one cannot safely or conveniently remove a CD from a case which requires the use of two hands. In this respect, it would be desirable if a device were provided which enabled the driver of a motor vehicle to remove a CD from its case without using two hands. Current CD cases generally include a container portion and a hinged lid that covers the container portion. The hinged lid is lifted to expose the CD and permits its removal from the case. CD cases generally include plastic lids and hinges, and, unfortunately, the plastic hinges often have a tendency to break during use. In this respect, it would be desirable if a compact disc case were provided which does not include a hinged lid.

In order to lift a hinged lid, a clearance must be provided above the hinged lid. The necessary clearance must be at least several times the height of the CD case when the lid is closed. In certain environments, however, such an extensive clearance above the CD is not readily available. In this respect, it would be desirable if a compact disc case were provided which does not require a clearance space above the CD case in order to gain access to the CD.

Throughout the years, a number of innovations have been developed relating to cases for CD's, and the following U.S. patents are representative of some of those innovations: U.S. Pat. Nos. 4,613,044; 4,736,840; 4,998,618; 5,168,991; and 5,205,405. More specifically, U.S. Pat. No. 4,613,044 discloses a compact disc case which includes a lid that is lifted above a lower container portion to gain access to the CD.

U.S. Pat. No. 4,736,840 discloses a protective holder for a compact disc which retains a CD by a frictional pinch fit on the CD. A disadvantage of using this device is that repetitive frictional pinching of the CD may cause premature wear or damage to the CD. In this respect, it would be desirable if a compact disc case were provided which does not retain the CD by frictionally pinching the CD.

U.S. Pat. No. 4,998,618 discloses a storage case for CD's which is used for storing a plurality of CD's. Each CD is stored on its own individual tray that pivots around a spindle located in a corner of the case. The edges of each tray appear to be flush with each other. As a consequence, it may be difficult for a specific tray and CD to be selected. Moreover, each CD is completely surrounded on its circumference by a portion of the tray which holds it. As a result, to remove a CD from a tray, two hands need to be used. One hand lifts the CD upward, and the other hand pulls the CD out of the tray. In this respect, it would be desirable if a compact disc case were provided which employs a tray that does not completely surround the circumference of the retained CD.

U.S. Pat. No. 5,168,991 discloses a compact disc package with a moveable carrier which includes two pivoted covers. U.S. Pat. No. 5,205,405 discloses a compact disc holder and package therefor. A tray in longitudinally telescopic within the holder. A disadvantage of this device is that the tray may be pulled out too far and be separated from the holder. In this respect, it would be desirable if a compact disc case were provided which included a device that prevented a tray that holds the CD from being completely separated from the case.

Thus, while the foregoing body of prior art indicates it to be well known to use cases for compact discs, the prior art described above does not teach or suggest a compact disc case which has the following combination of desirable features: (1) enables the driver of a motor vehicle to remove a CD from its case without using two hands; (2) does not include a hinged lid; (3) does not require a clearance space above the CD case in order to gain access to the CD; (4) does not retain the CD by frictionally pinching the CD; (5) employs a tray that does not completely surround the circumference of the retained CD; and (6) prevents a tray that holds the CD from being completely separated from the case. The foregoing desired characteristics are provided by the unique compact disc case of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new and improved compact disc case apparatus which includes a lower case assembly which is rectangularly shaped and includes a first lower corner. An upper case assembly which is rectangularly shaped and includes a first upper corner. The upper case assembly and the lower case assembly are adapted to be placed in registration with each other to form an enclosure assembly. The enclosure assembly includes a side which contains a slot. A pivot assembly is connected between the lower case assembly and the upper case assembly adjacent to the first lower corner and the first upper corner. A disc retention tray is positioned between the lower case assembly and the upper case assembly. The disc retention tray includes a pivot-receiving channel which is placed in registration with the pivot assembly such that the disc retention tray is capable of pivoting around the pivot assembly to be moved to an open position from a closed position and to a closed position from an open position.

In the closed position, the disc retention tray is housed completely in the enclosure assembly. In the open position, the disc retention tray is substantially outside the enclosure assembly such that a disc can be selectively taken off of and placed on the disc retention tray. The disc retention tray includes a handle portion. The enclosure assembly includes a truncated corner which is distal to the first lower corner and the first upper corner and which is adjacent to the slotted side. The handle portion of the disc retention tray projects from the truncated corner of the enclosure assembly when the disc retention tray is in a closed position. The disc retention tray includes a recessed edge portion. The recessed edge portion of the disc retention tray is located adjacent to the handle portion of the disc retention tray.

The disc retention tray includes a first position-holding member, and the enclosure assembly includes a second position-holding member, such that when the first position-holding member and the second position-holding member engage each other, the disc retention tray is held in a closed position. The first position-holding member includes an indentation on the disc retention tray, and the second position-holding member includes a complementary bump on the enclosure assembly.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved compact disc case which has all of the advantages of the prior art and none of the disadvantages.

It is another object of the present invention to provide a new and improved compact disc case which may be easily and efficiently manufactured and marketed.

It is a further object of the present invention to provide a new and improved compact disc case which is of durable and reliable construction.

An even further object of the present invention is to provide a new and improved compact disc case which is susceptible of a low cost of manufacture with regard to both materials and labor, and which accordingly is then susceptible of low prices of sale to the consuming public, thereby making such compact disc case available to the buying public.

Still yet a further object of the present invention is to provide a new and improved compact disc case which enables the driver of a motor vehicle to remove a CD from its case without using two hands.

Still another object of the present invention is to provide a new and improved compact disc case that does not include a hinged lid.

Yet another object of the present invention is to provide a new and improved compact disc case which does not require a clearance space above the CD case in order to gain access to the CD.

Even another object of the present invention is to provide a new and improved compact disc case that does not retain the CD by frictionally pinching the CD.

Still a further object of the present invention is to provide a new and improved compact disc case which employs a tray that does not completely surround the circumference of the retained CD.

Yet another object of the present invention is to provide a new and improved compact disc case that prevents a tray that holds the CD from being completely separated from the case.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

Figure 1:
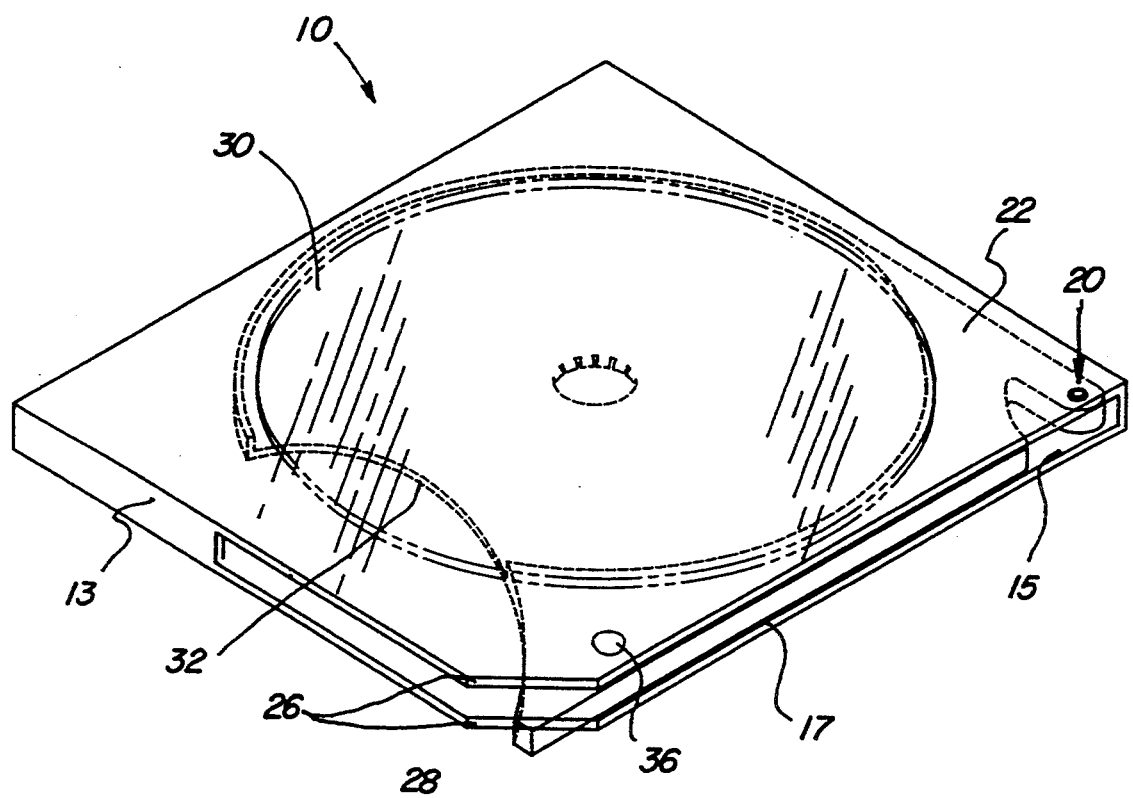
FIG. 1 is a perspective view showing a preferred embodiment of the compact disc case of the invention holding a CD, wherein the case is in a closed condition.

With reference to the drawings, a new and improved compact disc case embodying the principles and concepts of the present invention will be described.

Turning to FIGS. 1-8, there is shown an exemplary embodiment of the compact disc case of the invention generally designated by reference numeral 10. In its preferred form, compact disc case 10 includes a lower case assembly 12 which is rectangularly shaped and includes a first lower corner 14. An upper case assembly 16 which is rectangularly shaped and includes a first upper corner 18. The upper case assembly 16 and the lower case assembly 12 are adapted to be placed in registration with each other to form an enclosure assembly 13. The enclosure assembly 13 includes a side 17 which contains a slot 15. A pivot assembly 20 is connected between the lower case assembly 12 and the upper case assembly 16 adjacent to the first lower corner 14 and the first upper corner 18. A disc retention tray 22 is positioned between the lower case assembly 12 and the upper case assembly 16. The disc retention tray 22 includes a pivot-receiving channel 24 which is placed in registration with the pivot assembly 20 such that the disc retention tray 22 is capable of pivoting around the pivot assembly 20 to be moved to an open position from a closed position and to a closed position from an open position.

Figure 2:
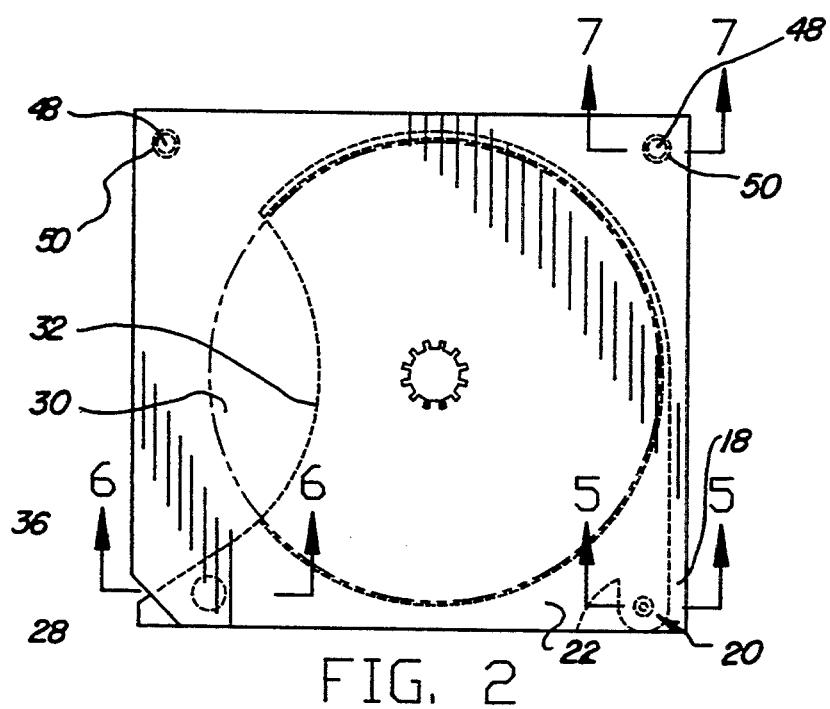
FIG. 2 is a top view of the embodiment of the compact disc case shown in FIG. 1, wherein the case is in a closed condition.

As shown in FIG. 2, in the closed position, the disc retention tray 22 is housed completely in the enclosure assembly 13. In the open position, the disc retention tray 22 is substantially outside the enclosure assembly 13 such that a disc 30 can be selectively taken off of and placed on the disc retention tray 22. The disc retention tray 22 includes a handle portion 28. The enclosure assembly 13 includes a truncated corner 26 which is distal to the first lower corner 14 and the first upper corner 18 and which is adjacent to the slotted side 17. The handle portion 28 of the disc retention tray 22 projects from the truncated corner 26 of the enclosure assembly 13 when the disc retention tray 22 is in a closed position. The disc retention tray 22 includes a recessed edge portion 32. The recessed edge portion 32 of the disc retention tray 22 is located adjacent to the handle portion 28 of the disc retention tray 22.

Figure 6:
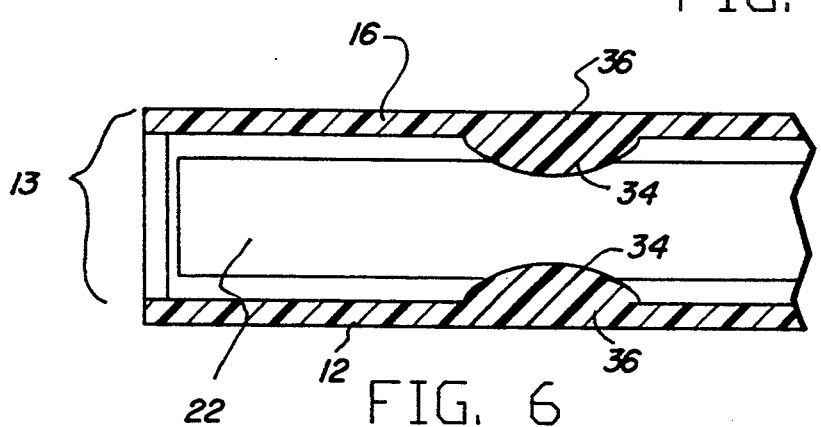
FIG. 6 is an enlarged cross-sectional view of a portion of the invention shown in FIG. 2 taken along line 6—6 of FIG. 2.

As shown in FIG. 6, the disc retention tray 22 includes a first position-holding member 34, and the enclosure assembly 13 includes a second position-holding member 36, such that when the first position-holding member 34 and the second position-holding member 36 engage each other, the disc retention tray 22 is held in a closed position. The first position-holding member 34 includes an indentation 34 on the disc retention tray 22, and the second position-holding member 36 includes a complementary bump 36 on the enclosure assembly 13.

Figure 5:
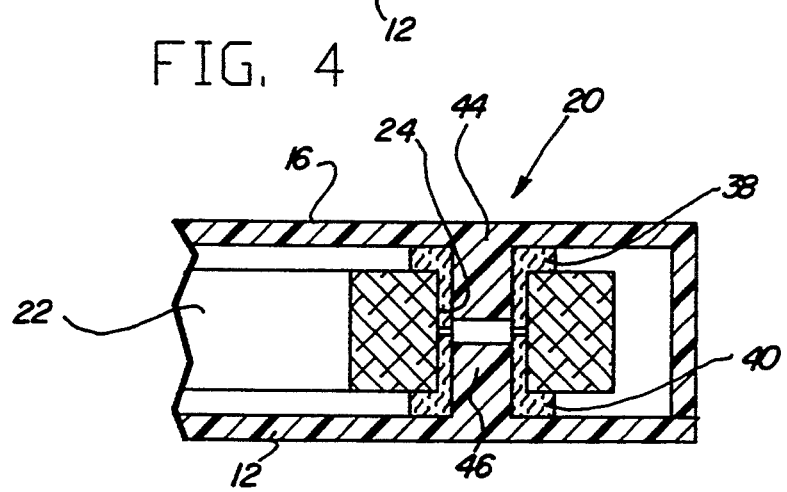
FIG. 5 is an enlarged cross-sectional view of a portion of the invention shown in FIG. 2 taken along line 5—5 of FIG. 2.

As shown in FIG. 5, the pivot assembly 20 includes an upper bushing 38 that is placed between the upper case assembly 16 and the disc retention tray 22. The pivot assembly 20 also includes a lower bushing 40, that is placed between the lower case assembly 12 and the disc retention tray 22. The upper case assembly 16 includes an upper protuberance 44 that protrudes into the upper bushing 38, and the lower case assembly 12 includes a lower protuberance 46 that protrudes into the lower bushing 40. The disc retention tray 22 pivots on the upper bushing 38 and the lower bushing 40.

Figure 7:
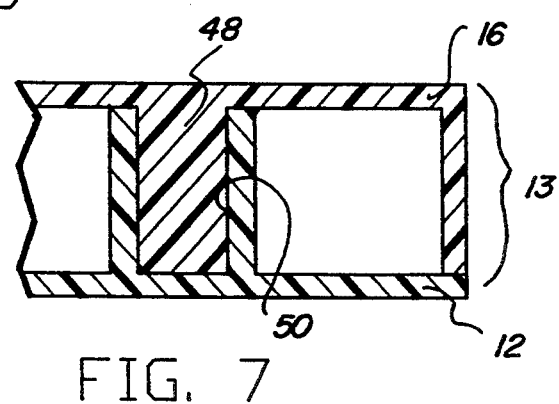
FIG. 7 is an enlarged cross-sectional view of a portion of the invention shown in FIG. 2 taken along line 7—7 of FIG. 2.
Figure 8:
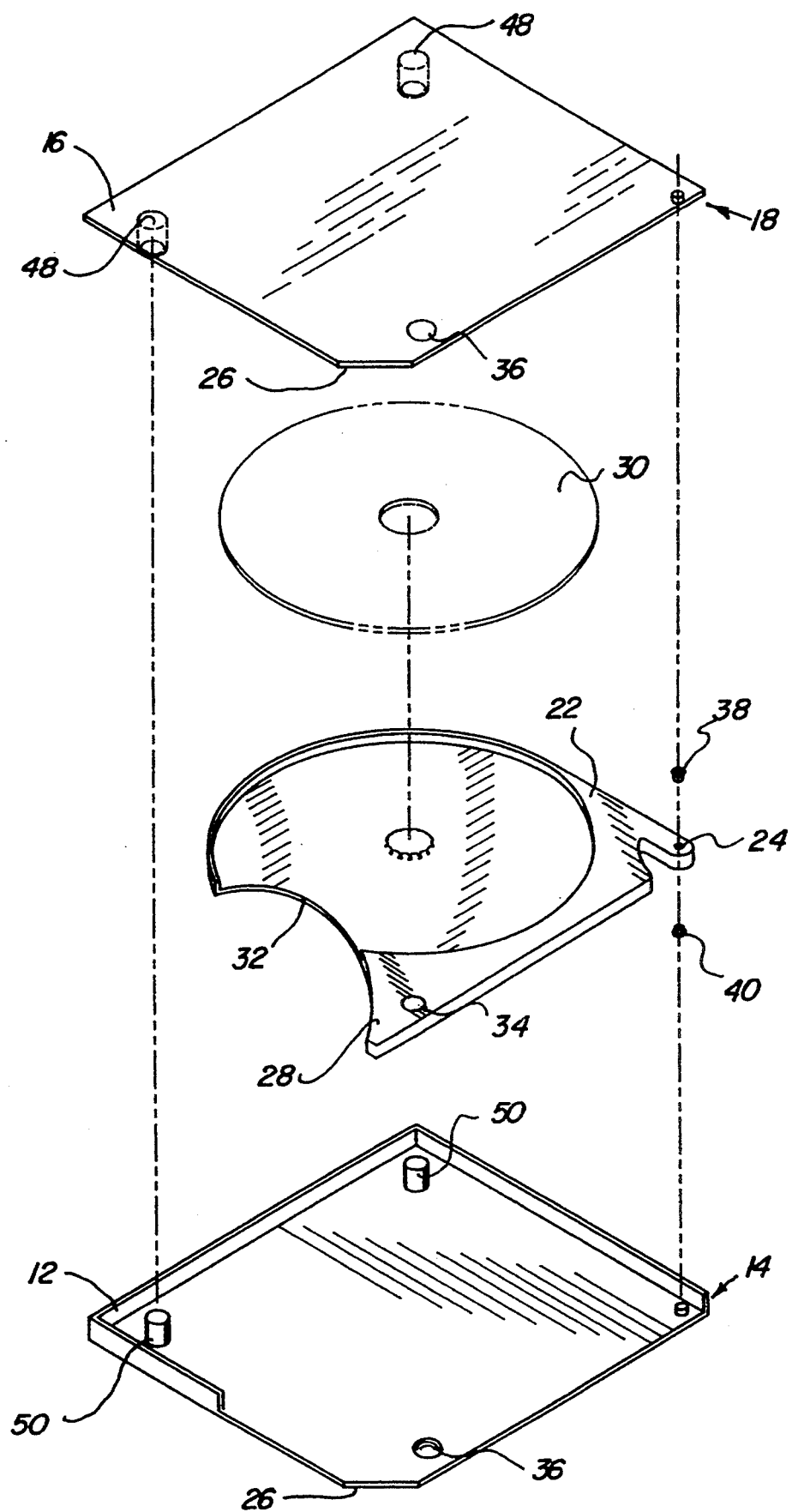
FIG. 8 is an exploded perspective view of the embodiment of the invention shown in FIG. 1.

As shown in FIG. 7, the upper case assembly 16 has a fastening element 48 that is adapted to be placed in registration with a complementary fastening well 50 in the lower case assembly 12. The interengagement of the fastening element 48 and the complementary fastening well 50 secures the upper case assembly 16 to the lower case assembly 12 to provide the enclosure assembly 13.

In using the compact disc case 10 of the invention, a disc 30 is stored on the disc retention tray 22 and is retained within the enclosure assembly 13 when the disc retention tray 22 is in the closed position, as shown in FIGS. 1 and 2. When the disc retention tray 22 is in the closed position, the indentations 34 on the disc retention tray 22 are in engagement with the complementary bumps 36 on the enclosure assembly 13.

Figure 3:
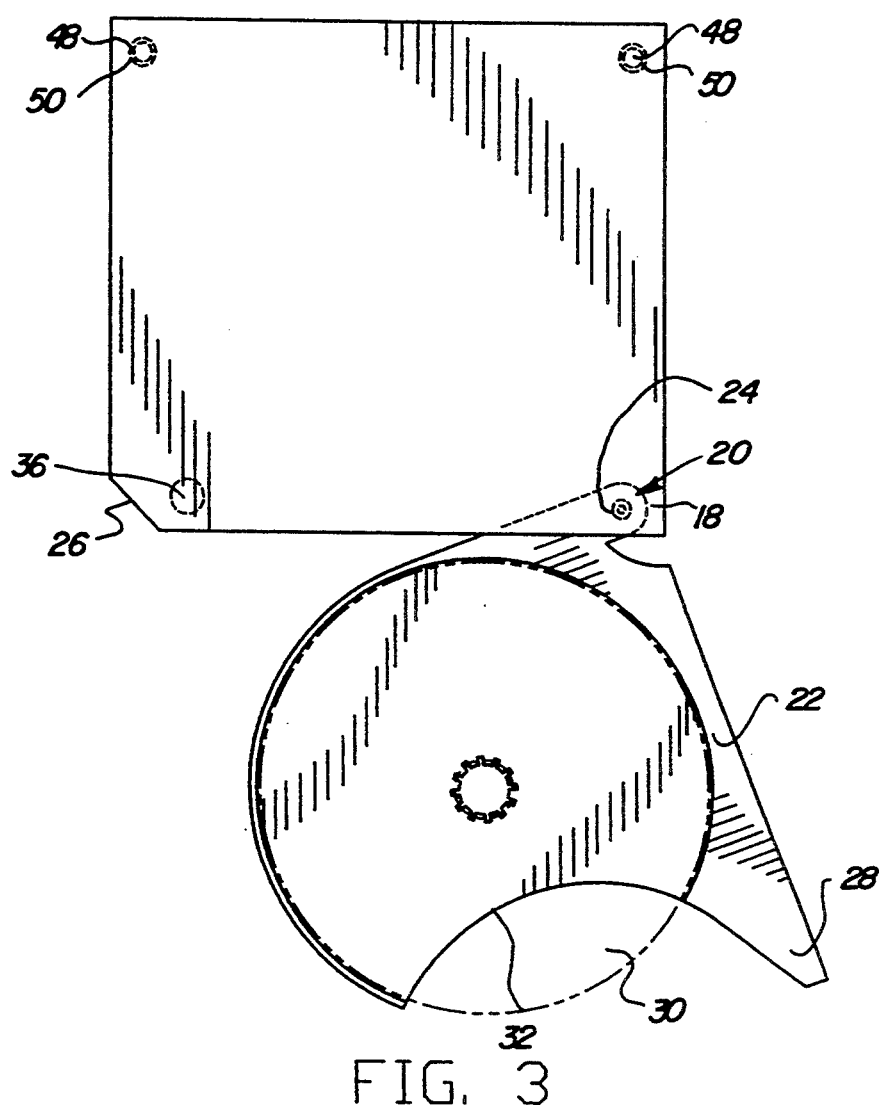
FIG. 3 is a top view of the embodiment of the compact disc case of FIG. 2, wherein the case is in an open condition.
Figure 4:
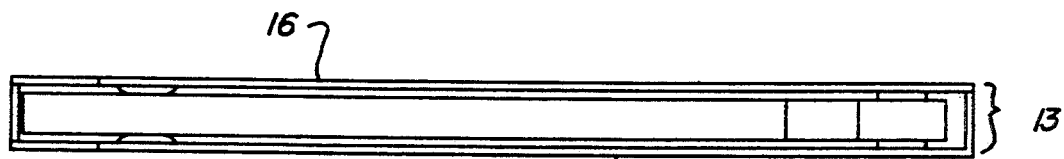
FIG. 4 is an enlarged side view of the embodiment of the invention shown in FIG. 2.

To remove a disc 30 from the compact disc case 10, the handle portion 28 of the disc retention tray 22 is grasped by a person's fingers on one's hand. The person pulls on the handle portion 28 causing the bumps 36 to be disengaged from the indentations 34 and causing the disc retention tray 22 to swing around the pivot assembly 20. When the disc retention tray 22 is pulled to the open position as shown in FIG. 3, the person releases the handle portion 28 and moves one's fingers to the recessed edge portion 32 of the disc retention tray 22 where the person grasps the disc 30 and lifts the disc 30 off of the disc retention tray 22 so that it can be played and used.

When the disc 30 is in use, the person can push the empty disc retention tray 22 back to the closed position. To return the disc 30 to the compact disc case 10, the disc retention tray 22 is pulled back out to the open position, the disc 30 is returned to the disc retention tray 22, and the disc retention tray 22 is pushed back into the closed position.

The components of the compact disc case of the invention can be made from inexpensive and durable plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved compact disc case that is low in cost, relatively simple in design and operation, and which may advantageously be used to enable the driver of a motor vehicle to remove a CD from its case without using two hands. With the invention, a compact disc case is provided which does not include a hinged lid. With the invention, a compact disc case is provided which does not require a clearance space above the CD case in order to gain access to the CD. With the invention, a compact disc case is provided which does not retain the CD by frictionally pinching the CD. With the invention, a compact disc case is provided which employs a tray that does not completely surround the circumference of the retained CD. With the invention, a compact disc case is provided which prevents a tray that holds the CD from being completely separated from the case.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A new and improved compact disc case apparatus, comprising:
- a lower case assembly which is rectangularly shaped and includes a first lower corner,
- an upper case assembly which is rectangularly shaped and includes a first upper corner, wherein said upper case assembly and said lower case assembly are adapted to be placed in registration with each other to form an enclosure assembly, wherein said enclosure assembly includes a side which contains a slot, wherein said enclosure assembly includes an obtuse-angled corner which is distal to said first lower corner and said first upper corner and which is adjacent to said slotted side,
- a pivot assembly connected between said lower case assembly and said upper case assembly adjacent to said first lower corner and said first upper corner, and
- a disc retention tray positioned between said lower case assembly and said upper case assembly, wherein said disc retention tray includes a disc-contacting portion and a support portion for supporting said disc-contacting portion, wherein said disc-contacting portion includes a recessed edge portion adapted such that a circular compact disc which is supported by said disc-contacting portion has a portion which extends past said recessed edge portion such that the circular compact disc can be readily grasped by a person as the circular compact disc rests on said disc-contacting portion, wherein said support portion of said disc retention tray includes a pivot-receiving channel, wherein said pivot-receiving channel is placed in registration with said pivot assembly such that said disc retention tray is capable of pivoting around said pivot assembly to be moved to and from a closed position wherein said disc retention tray is housed completely in said enclosure assembly and to and from an open position wherein said disc retention tray is substantially outside said enclosure assembly such that a disc can be selectively taken off of and placed on said disc retention tray, wherein said disc retention tray includes a handle portion which is in registration with said obtuse-angled corner and projects from said obtuse-angled corner of said enclosure assembly when said disc retention tray is in a closed position, wherein said recessed edge portion of said disc retention tray is located adjacent to said handle portion of said disc retention tray.

2. The apparatus described in claim 1 wherein:
said disc retention tray includes a first position-holding member, and
said enclosure assembly includes a second position-holding member, such that when said first position-holding member and said second position-holding member engage each other, said disc retention tray is held in a closed position.

3. The apparatus described in claim 2 wherein:
said first position-holding member includes an indentation on said disc retention tray, and
said second position-holding member includes a complementary bump on said enclosure assembly.

* * * * *